(12) United States Patent
Sone et al.

(10) Patent No.: US 7,893,164 B2
(45) Date of Patent: Feb. 22, 2011

(54) PROCESS FOR PRODUCING CONJUGATED DIOLEFIN (CO) POLYMER RUBBER, CONJUGATED DIOLEFIN (CO) POLYMER RUBBER, RUBBER COMPOSITION, AND TIRE

(75) Inventors: Takuo Sone, Mie (JP); Takaomi Matsumoto, Mie (JP); Toshihiro Tadaki, Mie (JP)

(73) Assignee: JSR Corporation, Tokyo (JP)

( * ) Notice: Subject to any disclaimer, the term of this patent is extended or adjusted under 35 U.S.C. 154(b) by 504 days.

(21) Appl. No.: 11/574,830

(22) PCT Filed: Sep. 14, 2005

(86) PCT No.: PCT/JP2005/016899
§ 371 (c)(1),
(2), (4) Date: Mar. 7, 2007

(87) PCT Pub. No.: WO2006/030806
PCT Pub. Date: Mar. 23, 2006

(65) Prior Publication Data
US 2008/0045664 A1    Feb. 21, 2008

(30) Foreign Application Priority Data
Sep. 14, 2004   (JP) ............................. 2004-267440

(51) Int. Cl.
*C08L 83/00*   (2006.01)
(52) U.S. Cl. ........................... 525/271; 525/100
(58) Field of Classification Search .............. 525/271, 525/100
See application file for complete search history.

(56) References Cited

U.S. PATENT DOCUMENTS

| 4,742,117 A * | 5/1988 | Tsutsumi et al. ............... 528/98 |
| 5,494,955 A * | 2/1996 | Swor et al. .................... 524/496 |
| 2005/0020757 A1 * | 1/2005 | Ozawa et al. ................ 524/492 |

FOREIGN PATENT DOCUMENTS

| EP | 1 022 291 | 7/2000 |
| JP | 61 141741 | 6/1986 |
| JP | 62-221902 | 9/1987 |
| JP | 1 284503 | 11/1989 |
| JP | 2001-040001 | 2/2001 |
| JP | 2002 103912 | 4/2002 |
| JP | 2004 18795 | 1/2004 |
| WO | WO 01/34658 | 5/2001 |
| WO | 03 048216 | 6/2003 |
| WO | WO 03/102032 | 12/2003 |

OTHER PUBLICATIONS

U.S. Appl. No. 12/531,346, filed Sep. 15, 2009, Tadaki, et al.
U.S. Appl. No. 12/532,720, filed Sep. 23, 2009, Matsumoto, et al.
Supplementary European Search Report mailed Oct. 19, 2010.

* cited by examiner

*Primary Examiner*—Ling-Siu Choi
*Assistant Examiner*—Chun-Cheng Wang
(74) *Attorney, Agent, or Firm*—Oblon, Spivak, McClelland, Maier & Neustadt, L.L.P.

(57) ABSTRACT

There is provided a method for producing a conjugated diolefin (co)polymer rubber excellent in processability, independently of the kind and combination of filling agent incorporated, excellent in a balance among wet-skid characteristics, low hysteresis loss, wear resistance and breaking strength, when vulcanization treatment is performed to form a vulcanized rubber, and useful as a material for a tread or a sidewall member of a tire for low fuel consumption, a large sized tire or a high performance tire.

A method for producing a conjugated diolefin (co) polymer rubber, which comprises polymerizing either a conjugated diolefin or a conjugated diolefin and an aromatic vinyl compound in a hydrocarbon solvent by anionic polymerization using at least one compound selected from the group consisting of an organic alkali metal and an organic alkali earth metal as an initiator, thereafter reacting a living polymer chain end thereof with a polyisocyanate compound, and then reacting a residual isocyanate group of the polyisocyanate compound bonded to the living polymer chain end with an alkoxysilane compound containing a functional group having active hydrogen; and a conjugated diolefin (co)polymer rubber obtained therefrom.

18 Claims, No Drawings

PROCESS FOR PRODUCING CONJUGATED DIOLEFIN (CO) POLYMER RUBBER, CONJUGATED DIOLEFIN (CO) POLYMER RUBBER, RUBBER COMPOSITION, AND TIRE

TECHNICAL FIELD

The present invention relates to a method for producing a conjugated diolefin (co)polymer rubber, a conjugated diolefin (co)polymer rubber, a rubber composition and a tire. More particularly, the invention relates to a method for producing a conjugated diolefin (co)polymer rubber which can provide an automotive tire tread having good processability and a balance among wear resistance, failure characteristics, low hysteresis loss and wet-skid characteristics, a conjugated diolefin (co)polymer rubber obtained thereby, a rubber composition and a tire.

BACKGROUND ART

With a recent demand for a reduction in fuel consumption of automobiles, a conjugated diolefin-based rubber having low rolling resistance, and excellent wear resistance and failure characteristics, and also having steering stability represented by wet-skid resistance has been desired as a rubber material tire.

What is necessary to reduce the rolling resistance of a tire is oust to lower the hysteresis loss of vulcanized rubber. As indexes for the evaluation of vulcanized rubber, impact resilience at 50 to 80° C., tan δ at 50 to 80° C., Goodrich heat build-up and the like are used. A rubber material having either high impact resilience at 50 to 80° C., or low tan δ at 50 to 80° C. or low Goodrich heat build-up is preferred.

As a rubber material having low hysteresis loss, natural rubber, polyisoprene rubber, polybutadiene rubber or the like are known. However, they have the problem of low wet-skid resistance.

As a method for reducing the hysteresis loss without impairing the wet-skid resistance, there has been proposed a method of introducing a functional group into a polymer chain end of a styrene-butadiene copolymer which is polymerized by use of an organic lithium initiator in a hydrocarbon sol vent and has a variety of structure. There are known a styrene-butadiene copolymer obtained by modifying or coupling a polymer chain end with a tin compound (patent document 1) and a styrene-butadiene copolymer obtained by modifying a polymer chain end with an isocyanate compound or the like (patent document 2). These modified polymers exert the effects of reducing the hysteresis loss without impairing the wet-skid resistance and providing excellent wear resistance and failure characteristics, particularly in a composition in which carbon black is blended as a reinforcing agent.

On the other hand, there has recently been proposed a method of using as a rubber material for tires a rubber composition in which silica or a mixture of silica and carbon black is blended as a reinforcing agent. A tire tread in which silica or a mixture of silica and carbon black is blended has low rolling resistance and good steering stability represented by wet-skid resistance. At the same time, however, the tire tread has the problem that the tensile strength and wear resistance of a vulcanization are low. The above-mentioned modified styrene-butadiene copolymer becomes a rubber material for tires excellent in wear resistance and failure characteristics in the composition using carbon black as the reinforcing agent. However, in the composition using silica as the reinforcing agent, the improving effect thereof is small.

For the purpose of improving the tensile strength and wear resistance of the vulcanizate in which silica or a mixture of silica and carbon black is blended as the reinforcing agent, rubber compositions each containing a polymer into which a functional group having an affinity for silica is introduced have been proposed. Patent document 3 proposes a method of allowing a silicon tetrahalide, a trihalosilane or the like to react to produce a polymer. Further, patent document 4 discloses a method for producing a polymer modified with a silane halide compound. Furthermore, patent document 5 discloses an alkylsilyl group-introduced diene-based rubber, and patent document 6 discloses a silyl halide group-introduced diene-based rubber. In addition, patent document 7 discloses a diene-based rubber into which a tertiary amino group and an alkoxysilyl group are introduced.

The physical properties are improved to a certain degree by using each of these modified polymers in the composition in which silica or a mixture of silica and carbon blacks blended. However, improvements in the tensile strength and wear resistance of the vulcanizate are not sufficient yet. In particular, when a mixture of silica and carbon black is blended, a reduction in hysteresis loss is also insufficient with an increase in the ratio of carbon black. Further, in general, a silica-containing composition is inferior in processability to a carbon black-containing composition, which poses the problem of high processing cost. When the above-mentioned polymer into which a functional group having an affinity for silica is introduced is used, the processability thereof is unfavorably apt to further deteriorate.

Modified polymers which have hitherto been known are mainly classified into two types, polymers suitable for carbon black blending and polymers suitable for silica blending. When the kind of reinforcing agent is chanced in the case of producing a tire or the like, it has been necessary to select again a rubber to be used. Further, when a mixture of silica and carbon black is blended, even the use of either of the types of modified polymers has increased or decreased the effect thereof in correlation with the mixing ratio of silica to carbon black.

In both the carbon black blending and the silica blending, amino group-introduced polymers are conceivable as effective modified polymers. For the carbon black blending, there are proposed (1) polymers each having an amino group introduced into a polymer chain end by use of a lithium amide initiator (patent document 8, patent document 9, patent document 10, patent document 11 and patent document 12) and (2) polymers each obtained by modifying a polymer chain end of a styrene-butadiene copolymer which is polymerized by use of an organic lithium initiator and has a variety of structure, with a nitrogen-containing compound such as a urea compound (patent document 13), a dialkyl aminobenzophenone compound (patent document 14 and patent document 15) or a lactam compound (patent document 16), Further, as polymers for silica blending, amino group-introduced diene-based rubbers are proposed in patent document 17, patent document 18 and patent document 19.

In each blending of the carbon black blending and the silica blending, the polymers obtained by these methods have achieved the improvements of various characteristics to a certain degree. However, the above-mentioned literatures mainly describe in detail the methods for introducing amino groups into the polymers, but make reference to nothing more than general matters with respect to the relationship between the structure of the polymer itself and each performance.

Patent Document 1: JP-A-57-55912
Patent Document 2: JP-A-61-141741
Patent Document 3: JP-B-49-36957
Patent Document 4: JP-B-52-5071
Patent Document 5: JP-A-1-188501
Patent Document 6: JP-A-5-230286
Patent Document 7: JP-A-7-233217
Patent Document 8: JP-A-59-38209
Patent Document 9: JP-B-5-1298
Patent Document 10: JP-A-6-279515
Patent Document 11: JP-A-6-199923
Patent Document 12: JP-A-7-53616
Patent Document 13: JP-A-61-27338
Patent Document 14: JP-A-58-162604
Patent Document 15: JP-A-58-189203
Patent Document 16: JP-A-61-43402
Patent Document 17: JP-A-1-101344
Patent Document 18: JP-A-64-22940
Patent Document 19: JP-A-9-71687

DISCLOSURE OF THE INVENTION

Problem That the Invention is to Solve

An object of the invention is to provide a method for producing a novel conjugated diolefin (co)polymer rubber.

Another object of the invention is to provide a method for producing a conjugated diolefin (co)polymer rubber having good processability in both carbon black blending and silica blending and usable as a material for a tread of a tire for low fuel consumption, a large sized tire or a high performance tire, in which low hysteresis loss properties and wet-skid characteristics are improved at the same time without impairing wear resistance and failure characteristics, or low hysteresis loss properties, wear resistance and failure characteristics are improved at the same time in a balanced manner without impairing wet-skid characteristics.

Still another object of the invention is to provide an industrially advantageous method for producing the conjugated diolefin (co)polymer rubber of the invention.

A further object of the invention is to provide a rubber composition having various characteristics as described above which contains the conjugated diolefin (co)polymer rubber of the invention.

A still further object of the invention is to provide a tire in which the rubber composition of the invention is used in a tread member or a sidewall member.

Means for Solving the Problems

The present invention relates to a me hod or producing a conjugated diolefin (co)polymer rubber, which comprises polymerizing either a conjugated diolefin or a conjugated diolefin and an aromatic vinyl compound in a hydrocarbon solvent by anionic polymerization using at least one compound selected from the group consisting of an organic alkali metal compound and an organic alkali earth metal compound as an initiator, thereafter reacting a living polymer chain end thereof with a polyisocyanate compound, and then reacting a residual isocyanate group of the polyisocyanate compound bonded to the living polymer chain end with an alkoxysilane compound (hereinafter also referred to as a functional group-containing alkoxysilane compound) containing a functional group having active hydrogen.

The active hydrogen-containing functional groups as used herein include an amino group, a mercapto group and a hydroxyl group.

Further, the silane compounds having the active hydrogen-containing functional group include a silane coupling agent.

Furthermore, specific examples of the above-mentioned functional group-containing alkoxysilane compounds include a compound represented by $H_2N(CH_2)_qSi(OR)_3$ (wherein q is an integer of 1 to 12, R's, which are the same or different, are an alkyl group having 1 to 20 carbon atoms or an aryl group).

It is preferred that the content of a urethane bond or a urea bond formed by the reaction of active hydrogen in the functional group-containing alkoxysilane compound with the isocyanate of the polyisocyanate compound or a bond obtained by the reaction of the mercapto group with the isocyanate group (such a bond is hereinafter also referred to as a specific bond) is from 0.5 to 200 mmol/kg·(co)polymer rubber polymer, and that the content of an alkoxysilyl group is from 0.5 to 200 mmol/kg·(co)polymer rubber polymer.

Then, the invention relates to a method for producing a conjugated diolefin (co)polymer rubber, which is characterized in that the alkoxysilyl groups of the functional group-containing alkoxysilane compound bonded to the polymer of the conjugated diolefin (co)polymer rubber obtained above are condensed using a condensation accelerator.

Here, the condensation of the alkoxysilyl groups of the functional group-containing alkoxysilane compound may be performed using an alkoxide compound of titanium.

Next, the invention relates to a conjugated diolefin (co)polymer rubber obtained by the above-mentioned production method.

Then, the invention relates to a rubber composition in which the conjugated diolefin (co)polymer rubber of the invention accounts for 30% or more by weight of all rubber components, and a filler is contained in an amount of 20 to 120 parts by weight based on 100 parts by weight of all rubber components.

Further, the invention relates to a tire in which the rubber composition of the invention is used in a tread member or a sidewall member.

Advantages of the Invention

According to the invention, there can be provided a method for producing a conjugated diolefin (co)polymer rubber having good processability, excellent in a balance among wet-skid characteristics, low hysteresis loss, wear resistance and breaking strength, when vulcanization treatment is performed to form a vulcanized rubber, and useful as a material for a tread of a tire for low fuel consumption, a large sized tire or a high performance tire; a conjugated diolefin (co)polymer rubber; a rubber composition; and a tire.

BEST MODE FOR CARRYING OUT THE INVENTION

The conjugated diolefin (co) polymer rubber (hereinafter also referred to as the (co)polymer rubber) obtained according to the invention is a (co)polymer obtained by (co)polymerizing either a conjugated diolefin alone or a conjugated diolefin and an aromatic vinyl compound, and characterized in that it has a specific bond formed by the reaction of active hydrogen in a functional group-containing alkoxysilane compound with an isocyanate of a polyisocyanate compound, and an alkoxysilyl group.

Further, the (co)polymer rubber to which this alkoxysilyl group is condensed has a siloxane bond formed by condensing the above-mentioned specific bond and the alkoxysilyl group, in its molecular chain.

The (co)polymer rubber obtained by the production method of the invention is preferably represented by the following formula (1):

[Formula 1]

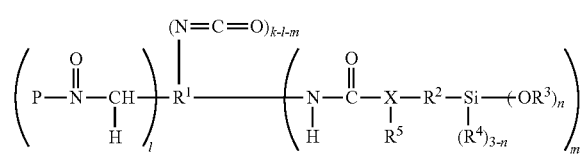
(1)

In formula (1), P is a conjugated diolefin or a (co)polymer chain of a conjugated diolefin and an aromatic vinyl compound, X is any one of a nitrogen atom, an oxygen atom and a sulfur atom, $R^1$ is an alkyl group having 1 to 20 carbon atoms or an aryl group, $R^2$ is an alkylene group having 1 to 12 carbon atoms, $R^3$ and $R^4$ are each independently an alkyl group having 1 to 20 carbon atoms or an aryl group, $R^5$ has no bond, or is a hydrogen atom, an alkyl group having 1 to 20 carbon atoms or an aryl group, k is an integer of 2 to 4, l is an integer of 1 to 3, m is an integer of 1 to 3, and n is an integer of 1 to 3, provided that $1+m \leq k$.

As the above-mentioned specific bond, a urea bond is preferred. In that case, the conjugated diolefin (co)polymer rubber obtained by the production method of the invention is represented by the following formula (2):

[Formula 2]

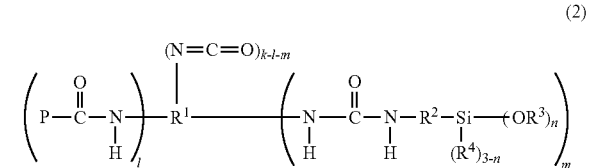
(2)

In formula (2), P is a conjugated diolefin or a (co)polymer chain of a conjugated diolefin and an aromatic vinyl compound, $R^1$ is an alkyl group having 1 to 20 carbon atoms or an aryl group, $R^2$ is an alkylene group having 1 to 12 carbon atoms, $R^3$ and $R^4$ are each independently an alkyl group having 1 to 20 carbon atoms or an aryl group, k is an integer of 2 to 4, l is an integer of 1 to 3, m is an integer of 1 to 3, and n is an integer of 1 to 3, provided that $1+m \leq k$.

Here, the content of the specific bond bonded to the (co)polymer rubber is preferably from 0.5 to 200 mmol/kg·(co)polymer rubber polymer. The content is more preferably from 1 to 100 mmol/kg·(co)polymer rubber polymer, and particularly preferably from 2 to 50 mmol/kg·(co)polymer rubber polymer.

The (co)polymer rubber polymer used herein means the weight of only a polymer not containing additives such as an antioxidant added during the production or after the production (hereinafter the same).

The specific bond may be bonded to any of a polymerization initiating end, a polymerization terminating end, a main chain of the polymer and a side chain. However, it is preferably introduced to the polymerization initiating end or the polymerization terminating end, in that the disappearance of energy from the polymer chain end can be inhibited to improve hysteresis loss characteristics.

Further, when the content of the specific bond bonded to the polymer chain exceeds 200 mmol/kg·(co)polymer rubber polymer, an interaction with the reinforcing agent such as carbon black or silica becomes too strong. As a result, viscosity increases to deteriorate processability. On the other hand, when the content of the specific bond is less than 0.5 mmol/kg·(co)polymer rubber polymer, the effect of introduction of the specific bond becomes difficult to appear. That is to say, improvements in the hysteresis loss characteristics, wear resistance and failure characteristics of the resulting (co)polymer rubber are unfavorably insufficient.

Further, the content of the alkoxysilyl groups bonded to the (co)polymer rubber is preferably from 0.5 to 200 mmol/kg·(co)polymer rubber polymer. The content is more preferably from 1 to 100 mmol/kg·(co)polymer rubber polymer, and particularly preferably from 2 to 50 mmol/kg·(co)polymer rubber polymer.

The alkoxysilyl group may be bonded to any of the polymerization initiating end, the polymerization terminating end, the main chain of the polymer and the side chain. However, the alkoxysilyl group is preferably introduced to the polymerization terminating end, in that the disappearance of energy can be inhibited from the polymer chain end to improve hysteresis loss characteristics.

Further, when the content of the alkoxysilyl groups bonded to the polymer chain exceeds 200 mmol/kg·(co)polymer rubber polymer, an interaction with the reinforcing agent such as carbon black or silica becomes too strong. As a result, viscosity increases to deteriorate processability. On the other hand, when the content of the alkoxysilyl groups is less than 0.5 mmol/kg·(co)polymer rubber polymer, the effect of introduction of the alkoxysilyl group comes not to appear. That is to say, improvements in the hysteresis loss characteristics, wear resistance and failure characteristics of the resulting (co)polymer rubber are unfavorably insufficient.

The (co)polymer rubber of the Invention can be produced by polymerizing either a conjugated diolefin or a conjugated diolefin and an aromatic vinyl compound in a hydrocarbon solvent by anionic polymerization using an organic alkali metal and/or an organic alkali earth metal as an initiator, (1) adding a polyisocyanate compound to react it with a living polymer chain end at the time when the polymerization has substantially completed (a first stage reaction), then (2) reacting a residual isocyanate group of the polyisocyanate compound bonded to the living polymer chain end with a functional group-containing alkoxysilane compound (a second stage reaction), and further conducting deblocking (hydrolysis) as needed.

According to this production method, (1) the specific bond and the alkoxysilyl group can be easily introduced by a two-step reactions, and (2) it is possible to obtain a high introduction rate.

A specific example of the two-step reaction of the invention is as follows. The first stage reaction is represented by formula (3), and the second stage reaction is represented by formula (4).

$$P^-Li^+OCNR'NCO \rightarrow P-R'NCO \qquad (3)$$

$$P-R'NCO+NH_2(CH_2)_qSi(OR)_3 \rightarrow$$

$$P-R'NHCONH(CH_2)_qSi(OR)_3 \qquad (4)$$

In the formula, P indicates a polymer chain, $P^-Li^+$ indicates a living polymer chain end, R' indicates an organic group, and q and R are the same as described above.

In the above-mentioned formula (3) (the first stage reaction), the living polymer chain end reacts with one isocyanate group of the diisocyanate compound to form a polymer having an isocyanate group at a chain end.

Then, in formula (4) (the second stage reaction), the polymer having an isocyanate group at a chain end, which is thus obtained, is reacted with the functional group-containing alkoxysilane compound (for example, 3-aminopropyltrimethoxysilane), thereby obtaining the conjugated diolefin (co)polymer rubber having a urea bond and an alkoxysilyl group in the polymer.

In the invention, the polyisocyanate compound used in formula (3), the first stage reaction, is not particularly limited, as long as it contains the isocyanate group which can react with the above-mentioned functional group-containing alkoxysilane compound. Examples thereof include 2,4-tolylene diisocyanate, 2,6-tolylene diisocyanate, 1,3-xylylene di-isocyanate, 1,4-xylylene diisocyanate, 1,5-naphthalene di-isocyanate, m-phenylene diisocyanate, p-phenylene diiso-cyanate, 3,3'-dimethyl-4,4'-diphenylmethane diisocyanate, 4,4'-diphenylmethane diisocyanate, 3,3'-dimethylphenylene diisocyanate 4,4'-biphenylene diisocyanate, 1,6-hexane di-isocyanate, isophorone diisocyanate, methylene bis(4-cyclohexyl isocyanate), 2,2,4-trimethylhexamethylene diisocyanate, bis(2-isocyanate ethyl)fumarate, 6-isopropyl-1,3-phenyl diisocyanate, 4-diphenylpropane diisocyanate, lysine diisocyanate, hydrogenerated diphenylmethane diisocyanate, 1,3-bis(isocyanate methyl) cyclohexane, tetramethylxylylene diisocyanate, 2,5(or 6)-bis(isocyanate methyl)-bicyclo-[2.2.1]heptane, polymethylene polyisocyanate and the like. Of these, 2,4-tolylene diisocyanate, isophorone diisocyanate, xylylene diisocyanate, methylene bis(4-cyclohexyl isocyanate), 1,3-bis(isocyanate methyl)cyclohexane and polymethylene polyisocyanate are more preferred.

In addition, the polyisocyanate compounds can be used either alone or as a combination of two or more thereof.

Further, the functional group-containing alkoxysilane compounds used in formula (4), the second stage reaction, in the invention include a silane coupling agent having an amino group, a mercapto group or a hydroxyl group. It is preferred that the functional group-containing alkoxysilane compound is represented by $H_2N(CH_2)_gSi(OR)_3$ (wherein g is an integer of 1 to 12, and R's, which are the same or different, are an alkyl group having 1 to 20 carbon atoms or a an aryl group).

Specific examples of these silane coupling agents include but are not limited to, for example, amino group-containing alkoxysilane compounds such as 3-aminopropyltriethoxysilane, 3-aminopropyltrimethoxysilane, N-(2-aminoethyl)-3-amino-propyltrimethoxysilane, N-(2-aminoethyl)-3-amino-prophyl-methyldimethoxysilane and N-phenyl-3-aminopropyl-trimethoxysilane; mercapto group-containing alkoxysilane compounds such as 3-mercaptopropyltrimethoxysilane and 3-mercaptopropyltriethoxysilane; hydroxyl group-containing alkoxysilane compounds such as 3-hydroxypropyltriethoxysilane and 3-hydroxypropyltrimethoxysilane; and the like.

The (co)polymer rubber of the invention is a (co)polymer obtained by (co)polymerizing either the conjugated diolefin or the conjugated diolefin and the aromatic vinyl compound, optionally with a copolymerizable third monomer, and characterized in that it has the specific functional group and the alkoxysilyl group as described above.

As the conjugated diolefin used in the invention, there is preferably used, for example, 1,3-butadiene, isoprene, 2,3-dimethyl-1,3-butadiene, 2-chloro-1,3-butadiene, 1,3-pentadiene, a mixture thereof or the like.

The amount of the conjugated diolefin used is usually from 40 to 100% by weight, and preferably from 50 to 95% by weight, based on all monomers. Less than 40% by weight results in inferior rolling resistance and wear resistance, and in hardening of the rubber at low temperatures to deteriorate grip performance and wet-skid resistance.

The aromatic vinyl compounds include, for example, styrene, 2-methylstyrene, 5-methylstyrene, 4-methylstyrene, α-methylstyrene, 2,4-dimethylstyrene, 2,4-diisopropylstyrene, 4-tert-butylstyrene, divinylbenzene, tert-butoxystyrene, vinylbenzyldimethylamine, (4-vinylbenzyl)dimethyl aminoethyl ether, N,N-dimethylaminoethylstyrene, 2-t-butylstyrene, 3-t-butylstyrene, 4-t-butylstyrene, vinylpyridine, a mixture thereof and the like. Of these, styrene is particularly preferred.

The amount of the aromatic vinyl compound used is usually 60% by weight or less, and preferably from 50 to 5% by weights based on all monomers.

Further, the third monomers include, for example, acrylonitrile, methyl methacrylate, ethyl methacrylate, methyl acrylate, ethyl acrylate, hydroxyethyl methacrylate and hydroxyethyl acrylate.

The amount of the third monomer used is usually less than 25% by weight, preferably 15% by weight or less, and more preferably 10% by weight or less, based on all monomers.

The (co)polymer rubbers of the invention include as a preferred embodiment a (co)polymer rubber of (A), (B) or (C) described below:

(A) A (co)polymer rubber (hereinafter sometimes referred to as a first (co)polymer rubber) in which (1) the content of polymerization units of the aromatic vinyl compound is less than 30% by weight based on the (co)polymer rubber, the content of polymerization units of the conjugated diolefin is more than 70% by weight based on the (co)polymer rubber, and the content of polymerization units of the copolymerizable third monomer is from 0% by weight to less than 25% by weight based on the (co)polymer rubber, and (2) the vinyl bond content is 50 mol % or more based on the polymerization units of the conjugated diolefin;

(B) A (co)polymer rubber (hereinafter sometimes referred to as a second (co)polymer rubber) in which (1) the content of polymerization units of the aromatic vinyl compound is from 30 to 50% by weight based on the (co)polymer rubber, the content of polymerization units of the conjugated diolefin is from 50 to 70% by weight based on the (co)polymer rubber, and the content of polymerization units of the copolymerizable third monomer is from 0 to 20% by weight based on the (co)polymer rubber, and (2) the vinyl bond content is from 15 to 50 mol % based on the polymerization units of the conjugated diolefin; and (C) A (co)polymer rubber (hereinafter sometimes referred to as a third (co)polymer rubber) in which (1) the content of polymerization units of the conjugated diolefin is from 80 to 100% by weight based on the (co)polymer rubber, and the content of polymerization units of the copolymerizable third monomer is from 20 to 0% by weight based on the (co) polymer rubber, and (2) the vinyl bond content is 50 mol % or more based on the polymerization units of the conjugated diolefin.

The content of the bonded aromatic vinyl compound bonded to the polymer chain, that is to say, the content o polymerization units of the aromatic vinyl compound, is less than 30% by weight, and more preferably from 5% by weight to 27% by weight, based on the (co)polymer rubber, as described above, in the first (co)polymer rubber of the invention. When the content of the bonded aromatic vinyl compound is 30% or more by weigh, a balance between hysteresis loss and wet-skid characteristics deteriorates.

The content of the conjugated diolefin bonded to the polymer chain, that is to say, the content of polymerization units of the conjugated diolefin is more than 70% by weight, preferably 95% or less by weight, and more preferably from 73% by weight to 90% by weight, in the first (co)polymer rubber of the invention.

The vinyl bond (1,2-bond and/or 3,4-bond) content in polymerization units of the conjugated diolefin is 50 mol % or more, and preferably from 50 mol % to less than 60 mol %, based on the polymerization units of the conjugated diolefin, in the first (co)polymer rubber of the invention. When the vinyl bond content is less than 50 mol %, a balance between hysteresis loss and wet-skid characteristics deteriorates. Further, in a method for synthesizing an ordinary (co)polymer of the aromatic vinyl compound and the conjugated diolefin, it is difficult to exceed 90 mol %.

Furthermore, in the second (co)polymer rubber of the invention, the content of the bonded aromatic vinyl compound bonded to the polymer chain is from 30 to 50% by weight, and more preferably from 30% by weight to 45% by weight, based on the (co)polymer rubber, as described above. When the content of the bonded aromatic vinyl compound is less than 30% by weight, wet-skid characteristics, wear resistance and failure characteristics deteriorate. Exceeding 50% by weight results in an increase in hysteresis loss.

The content of polymerization units of the conjugated diolefin is from 50 to 70% by weight, and preferably from 55 to 70% by weight.

In addition, the vinyl bond (1,2-bond and/or 3,4-bond) content in polymerization units of the conjugated diolefin is from 15 to 50 mol %, and preferably from 18 to 47 mol %, based on the polymerization units of the conjugated diolefin, in the second (co)polymer rubber of the invention. When the vinyl bond content is less than 15 mol %, wet-skid characteristics are lowered to cause poor steering stability. On the other hand, exceeding 50 mol % results in deteriorated breaking strength and wear resistance, and in increased hysteresis loss.

Further, the third (co)polymer rubber of the invention has no bonded aromatic vinyl compound. When the aromatic vinyl compound is bonded to the (co)polymer rubber, low-temperature characteristics and low hysteresis loss deteriorate.

The production method of the invention is described below.

The polymerization reaction, reaction with the polyisocyanate compound and reaction with the functional group-containing alkoxysilane compound for obtaining the (co)polymer rubber of the invention are usually conducted within the temperature range of 0 to 120° C., under either constant temperature conditions or elevated temperature conditions. The polymerization system may be either a batch polymerization system or a continuous polymerization system.

Examples of the initiators of the organic alkali metal compounds and the organic alkali earth metal compounds used in the polymerization include alkyllithiums such as n-butyllithium, sec-butyllithium and t-butyllithium, alkylenedilithium such as 1,4-dilithiobutane, phenyllithium, stilbenelithium, lithiumnaphthalene, sodiumnaphthalene, potassiumnaphthalene, n-butylmagnesium, n-hexylmagnesium, ethoxycalcium, calcium stearate, t-butoxystrontium, ethoxy-barium, isopropoxybarium, ethylmercaptobarium, t-butoxy-barium, phenoxybarium, diethylaminobarium and barium stearate.

Further, the organic alkali metal compound as the above-mentioned initiator can be used as a reaction product with a secondary amine compound or a tertiary amine compound in the copolymerization of the conjugated diolefin and the aromatic vinyl compound. As the organic alkali metal allowed to react with the above-mentioned secondary amine compound or tertiary amine compound, an organic lithium compound is preferred. More preferably, n-butyllithium, sec-butyllithium or t-butyllithium is used.

Examples of the secondary amine compounds allowed to react with the organic alkali metal include dimethylamine, diethylamine, dipropylamine, di-n-butylamine, di-sec-butylamine, dipentylamine, dihexylamine, di-n-octylamine, di-(2-ethylhexyl) amine, dicyclohexylamine, N-methylbenzylamine, diallylamine, morpholine, piperazine, 2,6-dimethylmorpholine, 2,6-dimethylpiperazine, 1-ethylpiperazine, 2-methyl-piperazine, 1-benzylpiperazine, piperidine, 3,3-dimethyl-piperidine, 2,6-dimethylpiperidine, 1-methyl-4-(methyl-amino)piperidine, 2,2,6,6-tetramethylpiperidine, pyrrolidine, 2,5-dimethylpyrrolidine, azetidine, hexamethyleneimine, heptamethyleneimine, 5-benzyloxyindole, 3-azaspiro[5,5]-undecane, 3-azabicyclo[3.2.2]nonane, carbazole and the like.

Further, examples of the tertiary amine compounds allowed to react with the organic alkali metal include N,N-dimethyl-o-toluidine, N,N-dimethyl-p-toluidine, N,N-dimethyl-m-toluidine, α-picoline, β-picoline, γ-picoline, benzyldimethylamine, benzyldiethylamine, benzyldipropylamine, benzyldibutylamine, (o-methylbenzyl)dimethylamine, m-methylbenzyl)dimethylamine, (p-methylbenzyl) dimethylamine, N,N-tetramethylene-o-toluidine, N,N-heptamethylene-o-toluidine, N,N-hexamethylene-o-toluidine, N,N-trimethylene-benzylamine, N,N-tetramethylenebenzylamine, N,N-hexamethylenebenzylamine, N,N-tetramethylene(o-methylbenzyl)-amine, N,N-tetramethylene(p-methylbenzyl) amine, N,N-hexa-methylene(o-methylbenzyl)amine, N,N-hexamethylene(p-methyl-benzyl)amine and the like.

Furthermore, in the polymerization, an ether compound such as diethyl at di-n-butyl ether, ethylene glycol diethyl ether, ethylene glycol dibutyl ether, diethylene glycol dimethyl ether, propylene glycol dimethyl ether, propylene glycol diethyl ether, propylene glycol dibutyl ether, tetrahydrofuran, 2,2-(bistetrahydrofurfuryl)propane, bis-tetrahydrofurfuryl formal, methyl ether of tetrahydrofurfuryl alcohol, ethyl ether of tetrahydrofurfuryl alcohol, butyl ether of tetrahydrofurfuryl alcohol, α-methoxytetrahydrofuran, di-methoxybenzene or dimethoxyethane and/or a tertiary amine compound such as triethylamine, pyridine, N,N,N',N'-tetra-methylethylenediamine, dipiperidinoethane, methyl ether of N,N-diethylethanolamine, ethyl ether of N,N-diethylethanol-amine or butyl ether of N,N-diethylethanolamine can be added to the polymerization system to adjust a microstructure (vinyl bond content) of a conjugated diolefin moiety of the diolefin (co)polymer rubber, as needed.

The hydrocarbon solvents used in polymerizing the (co)polymer rubber of the invention include, for example, pentane, hexane, heptane, octane, methylcyclopentane, cyclohexane, benzene, toluene, xylene and the like. Of these, cyclohexane and heptane are preferred.

When the reactivity of the initiator used in the invention is intended to be improved, or when the aromatic vinyl compound introduced into the polymer is intended to be randomly arranged or a single chain of the aromatic vinyl compound is intended to be given, a potassium compound may be added together with the initiator. As the potassium compound added together with the initiator, there is used, for example, a potassium alkoxide represented by potassium isopropoxide, potassium t-butoxide, potassium t-amyloxide, potassium n-heptaoxide, potassium benzyloxide or potassium phenoxide; a potassium salt of an organic carboxylic acid such as isovaleric acid, capric acid, lauric acid, palmitic acid, stearic acid, oleic acid, linolenic acid, benzoic acid, phthalic acid or 2-ethylhexanoic acid; a potassium salt of an organic sulfonic acid such as dodecylbenzenesulfonic acid, tetradecylbenzenesulfonic acid, hexadecylbenzenesulfonic acid or octadecylbenzenesulfonic acid; or a potassium salt of an organic phosphorous acid partial ester such as diethyl phosphite, diisopropyl phosphite, diphenyl phosphite, dibutyl phosphite or dilauryl phosphite; or the like.

These potassium compounds can be added in an amount of 0.005 to 0.5 moles per gram atomic equivalent of alkali metal of initiator. Less than 0.005 mole results in no appearance of the effect of adding the potassium compound (improvement in reactivity of the initiators, randomization of the aromatic vinyl compound or giving of the single chain), whereas exceeding 0.5 mole results in a decrease in polymerization activity to cause productivity to substantially decrease, and in a decrease in modification efficiency at the time when the reaction for modifying the polymer chair end with the functional group is conducted.

The polyisocyanate compound is allowed to reacted with the polymer chain end thus obtained (the first stage reaction). The amount of the polyisocyanate compound used is usually from 0.1 to 40 moles, and preferably from 0.3 to 20 moles, per mole of metal atom (for example, lithium atom) of the living polymer chain end concerned. Less than 0.1 mole results in a decrease in the residual isocyanate group which reacts with the alkoxysilane compound, leading to no expression of the effect of introducing the specific bond and the alkoxysilyl group. On the other hand, exceeding 40 moles results in an increase in viscosity to cause deterioration of processability. The reaction time thereof is usually from 1 minute to 5 hours, and preferably from about 2 minutes to about 1 hour.

By this reaction, the polymer having a form in which one isocyanate group of the polyisocyanate compound, for example, the diisocyanate compound, is bonded to the chain end of the living polymer and the other isocyanate group remains is formed (see the above-mentioned formula (3)).

Then, in the invention, the above-mentioned functional group-containing alkoxysilane compound is subsequently added, and the isocyanate group remaining in the polyisocyanate compound bonded to the living polymer chain end is allowed to react with the functional group of the function group-containing compound (the second stage reaction).

The amount of the functional group-containing alkoxysilane compound used is usually from 0.1 to 40 moles, and preferably from 0.3 to 20 moles, per mole of isocyanate group of polymer chain end. Less than 0.1 mole results in no expression of the effect of introducing the specific bond and the alkoxysilyl group. On the other hand, exceeding 40 moles results in an excessively strong interaction with the reinforcing agent such as carbon black or silica to increase viscosity increases, thereby deteriorating processability.

The reaction time thereof is usually from 1 minute to 5 hours, and preferably from about 2 minutes to about 1 hour.

By this reaction, the (co)polymer rubber having the specific bond and the alkoxysilyl group at the polymer chain ends is obtained (see the above-mentioned formula 4)).

The weight average molecular weight of the (co)polymer rubber obtained in the invention is usually from 150,000 to 2,000,000, and preferably from 150,000 to 1,700,000, in terms of polystyrene, in the first stage reaction, and usually from 150,000 to 2,000,000, and preferably from 150,000 to 1,700,000, in the second stage reaction. When the weight average molecular weight in the second stage reaction is less than 150,000, the breaking strength, wear resistance and low hysteresis loss of the resulting rubber composition are insufficient. On the other hand, exceeding 2,000,000 results in poor processability and deteriorated filler dispersibility in kneading to cause deteriorated breaking strength, wear resistance, low hysteresis loss and wet-skid properties.

In addition, the Mooney viscosity ($ML_{1+4}$, 100° C.) of the (co)polymer rubber obtained in the invention is preferably within the range of 5 to 200 in the first stage reaction, and within the range of 5 to 200 in the second stage reaction. When the Mooney viscosity ($ML_{1+4}$, 100° C.) in the second stage reaction is less than 5, breaking strength, wear resistance and low hysteresis loss deteriorate. On the other hand, exceeding 200 results in a reduction in processability.

In the invention, the alkoxysilyl groups bonded to the (co)polymer rubber can be further condensed after the above-mentioned second stage reaction to form siloxane bonds, thereby increasing the molecular weight of the polymer (hereinafter also referred to as a "third stage reaction").

The third stage reaction (the condensation reaction of alkoxysilyl groups) in the invention may be either of a solution reaction and a sold phase reaction. However, a solution reaction (which may be a solution containing an unreacted monomer used in the polymerization) is suitable. Further, there is no particular limitation on the type of this reaction, and the reaction may be conducted using a batch type reactor or an apparatus such as a multistage continuous type reactor or an inline mixer. Further, it is important that this reaction is conducted after the termination of the polymerization reaction and before desolvation treatment, water treatment, heat treatment, various operations necessary for polymer isolation, and the like.

In order to accelerate this third stage reaction, it s preferred to use a condensation accelerator. As this condensation accelerator, there can be used a combination of a metal compound generally known as an alkoxy condensation catalyst and water. For example, a combination of a carboxylate of tin and/or a titanium alkoxide and water is suitably mentioned. There is no particular limitation on the method for putting water of the condensation accelerator into a reaction system. It may be introduced as a solution in an organic solvent such as an alcohol compatible with water, or water may be directly poured, dispersed and dissolved in a hydrocarbon solution by using various chemical engineering techniques.

As such a condensation accelerator one comprising at least one kind selected from the group consisting of metal compounds represented by the following (1) to (8) and water is preferred.

(1) A carboxylate of tin having an oxidation number of 2;
(2) A compound of tin having an oxidation number of 4;
(3) An alkoxide compound of titanium;
(4) A carboxylate of bismuth;
(5) An alkoxide compound of zirconium;
(6) A carboxylate of zirconium;
(7) An alkoxide compound of aluminum; and
(8) A carboxylate of aluminum.

The above-mentioned carboxylates of tin having an oxidation number of 2 (1) specifically include bis(2-ethylhexanoate)tin, bis(laurate)tin, bis(naphthate)tin, bis(stearate)tin, bis(oleate)tin, bis(linolate) tin and the like.

The above-mentioned compounds of tin having an oxidation number of 4 (2) specifically include n-butyltris(2-ethylhexanoate)tin, di-n-butylbis(2-ethylhexanoate)tin, di-n-butylbis(2-ethylhexylmaleate)tin, di-n-butylbis(acetylacetonate)tin, di-nbutyldilauryltin, di-n-octylbis(2-ethylhexanoate)tin, din-octylbis(2-ethylhexylmaleate)tin, di-n-octylbis(acetylacetonate)tin, di-noctyldilauryltin and the like.

The above-mentioned alkoxide compounds of titanium (3) specifically include tetraethoxytitanium, tetra-n-propoxy-titanium, tetra-i-propoxytitanium, tetra-n-butoxytitanium, tetra-sec-butoxytitanium, tetra-tert-butoxytitanium, tetra-(2-ethylhexanolate)-titanium, tetra(2-ethylexanedioleate)-titanium, titanium tributoxystearate, titanium tributoxy-acetylacetonate, titanium dibutoxybis(acetylacetonate), titanium tributoxyethylacetoacetate, titanium butoxyacetyl-acetoate bis(ethylacetoacetate), titanium tetrakis(acetyl-acetonate), titanium diacetylacetonate bis(ethylaceto-acetate) and the like.

The above-mentioned compounds of bismuth (4) specifically include tris(2-ethylhexanoate)bismuth, tris-(laurate) bismuth, tris(naphthate)bismuth, tris(stearate)-bismuth, tris (oleate)bismuth, tris(linolate)bismuth and the like.

The above-mentioned alkoxide compounds of zirconium (5) specifically include tetraethoxyzirconium, tetra-n-propoxy-zirconium, tetra-i-propoxyzirconium, tetra-n-butoxyzirconium, tetra-sec-butoxyzirconium, tetra-tert-butoxyzirconium, tetra(2-ethylhexyl)zirconium, zirconium tributoxystearate, zirconium tributoxyacetylacetonate, zirconium dibutoxy-bis(acetylacetonate), zirconium tributoxyethylacetoacetate, zirconium butoxyacetylacetonate bis (ethylacetoacetate), zirconium tetrakis(acetylacetonate), zirconium diacetyl-acetonate bis(ethylacetoacetate) and the like.

The above-mentioned carboxlates of zirconium (6) specifically include bis(2-ethylhexanoate)zirconium oxide, bis(laurate) zirconium oxide, bis(naphthate)zirconium oxide, bis (stearate)zirconium oxide, bis(oleate)zirconium oxide, bis (linolate)zirconium oxide, tetrakis(2-ethylhexanoate)-zirconium, tetrakis(laurate)zirconium, tetrakis(naphthate)-zirconium, tetrakis(stearate)zirconium, tetrakis(oleate)-zirconium, tetrakis(linolate)zirconium and the like.

The above-mentioned alkoxide compounds of aluminum (7) specifically include triethoxyaluminum, tri-n-propoxyaluminum, tri-i-propoxyaluminum, tri-n-butoxyaluminum, tri-sec-butoxyaluminum, tri-tert-butoxyaluminum, tri(2-ethylhexyl) aluminum, aluminum dibutoxystearate, aluminum dibutoxyacetylacetonate, aluminum butoxybis(acetylacetonate), aluminum dibutoxyethylacetoacetate, aluminum tris (acetyl-acetonate), aluminum tris(ethylacetoacetate) and the like.

The above-mentioned carboxylates of aluminum (8) specifically include tris(2-ethylhexanoate)aluminum, tris(laurate)aluminum, tris(naphthate)aluminum, tris(stearate)aluminum, tris(oleate)aluminum, tris(linolate)aluminum and the like.

Of these, preferred are bis(2-ethylhexanoate)tin, bis(laurate)tin, bis(oleate)tin, tetra-sec-butoxytitanium, tetra(2-ethylhexanolate)titanium, tetra(2-ethylhexanedi-oleatetitanium), tris(2-ethylhexanoate)bismuth, tetra-n-propoxyzirconium, tetra-n-butoxyzirconium, bis(2-ethyl-hexanoate)zirconium oxide, bis(oleate)zirconium oxide, tri-i-propoxyaluminum, tri-sec-butoxyaluminum, tris(2-ethylhexanoate)aluminum, tris(stearate)aluminum, zirconium tetrakis(acetylacetonate) and aluminum tris(acetylacetonate). Particularly preferred are tetra-sec-butoxytitanium and tetra(2-ethylhexanolate)titanium which are the alkoxide compounds of titanium (3).

On the other hand, as water, there is suitably used the form of a simple substance, a solution in an alcohol or the like, a dispersed micelle in a hydrocarbon solvent, or the like. In addition, water potentially contained in a compound which can release water in the reaction system, such as adsorbed water on a solid surface or hydrated water of a hydrate, can also be effectively used if necessary.

These two which form the condensation accelerator may be put into the reaction system either separately or as a mixture obtained by mixing them just before use. However, long-term storage of the mixture is unfavorable because it causes decomposition of the metal composition.

As for the amount of the condensation accelerator used, both the molar ratios of the metal of the above-mentioned metal compound and water effective for the reaction to the total amount of alkoxysilyl groups present in the reaction system are preferably 0.1 or more. Although the upper limit also varies depending on the purpose and the reaction conditions, it is preferred that effective water is present in a molar ratio to the amount of alkoxysilyl groups bonded to polymer chain ends of about 0.5 to about 3. The molar ratios of the metal of the above-mentioned metal compound and water effective for the reaction are preferably from about 1/0.5 to a out 1/20, although they vary also depending on the reaction conditions.

The hydrolysis and condensation reaction of the above alkoxysilyl groups are performed by conducting the reaction in the temperature range of 80 to 150° C., preferably 90 to 120° C., for 10 minutes or more, preferably 30 minutes or more.

The alkoxysilyl groups in the (co)polymer rubber are hydrolyzed and condensed by the above third stage reaction, whereby the polymers are coupled to each other by a siloxane bond to increase the molecular weight.

The (co)polymer obtained by the above second stage reaction or third stage reaction, which has a Mooney viscosity ($ML_{1+4}$, 100° C.) exceeding 100, is unfavorable because of its inferior processability as it is. However, an extender oil such as an aromatic process oil or a naphthenic process oil, or a liquid polymer having a weight average molecular weight of 150,000 or less is added, thereby decreasing the Mooney viscosity to 100 or less, which also allows the (co)polymer to be used without a problem in processability.

The extender oil used is not particularly limited, as long as it is an extender oil or a softening agent ordinarily used in a diene-base rubber. However, a mineral oil-based extender oil is preferably used. In general, mineral oil-based extender oils are mixtures of aromatic oils, alicyclic oils and aliphatic oils, and classified into the aromatic family, alicyclic family (naphthenic family) and aliphatic family (paraffinic family) according to the amount ratio thereof. Any of them can be used. The viscosity-gravity constant (hereinafter referred to as V.G.C. for brevity) of the extender oil is preferably from 0.790 to 1.100, more preferably from 0.790 to 1.049, still more preferably from 0.790 to 0.99, and particularly preferably from 0.790 to 0.949. Above all, an aromatic mineral oil (aromatic oil) having a viscosity-gravity constant (V.G.C value) of 0.900 to 1.049 and an aliphatic mineral oil (naphthenic oil) having a V.G.C of 0.800 to 0.899 are preferably used in terms of low hysteresis loss properties/wet-skid resistance.

Of these, the aromatic extender oils satisfying the above-mentioned viscosity-gravity constant include Diana Process Oil AC-12, AC460, AH-16 and AH-58 manufactured by Idemitsu Kosan Co., Ltd., Mobile Sol K, Mobile Sol 22 and Mobile Sol 130 manufactured by Exxon Mobil Co., Kyoseki Process X50, X100 and X140 manufactured by Nikko Kyoseki Co., Ltd., Rezox No. 3 and Dutorex 729UK manufactured by Shell Chemicals Co., Ltd., Koumorex 200, 300, 500 and 700 manufactured by Nippon Oil Corporation, Esso Process Oil 110 and Esso Process Oil 120 manufactured by Exxon Mobil Co., Mitsubishi 34 Heavy Process Oil, Mitsubishi 44 Heavy Process Oil, Mitsubishi 38 Heavy Process Oil and Mitsubishi 39 Heavy Process Oil manufactured by Nippon Oil Corporation, and the like.

Further, the naphthenic extender oils satisfying the above-mentioned viscosity-gravity constant include Diana Process Oil NS-24, NS-100, NM-26, NM-280 and NP-24 manufactured by Idemitsu Kosan Co., Ltd., Naprex 38 manufactured by Exxon Mobil Co., Fukkol FLEX#1060N, #1150N, #1400N, #2040N and #2050N manufactured by Fuji Kosan Co., Ltd., Kyoseki Process R25, R50, R200 and R1000 manufactured by Nikko Kyoseki Co., Ltd., Shellflex371JY, Shellflex371N, Shellflex451, Shellflex N-40, Shellflex 22, Shellflex 22R, Shellflex 32R, Shellflex 100R, Shellflex 100S, Shellflex 100SA, Shellflex 220RS, Shellflex 220S, Shellflex 260, Shellflex 320R and Shellflex 680 manufactured by Shell Chemicals Co., Ltd., Koumorex No. 2 Process Oil manufactured by Nippon Oil Corporation, Esso Process Oil L-2 and Esso Process Oil 765 manufactured by Exxon Mobil Co., Mitsubishi 20 Light Process Oil manufactured by Nippon Oil Corporation, and the like.

Furthermore, the paraffinic extender oils satisfying the above-mentioned viscosity gravity constant include Diana Process Oil PW-90, PW-380, PS-32, PS-90 and PS-430 manufactured by Idemitsu Kosan Co., Ltd., Fukkol Process P-100, P-200, P-300, P400 and P-500 manufactured by Fuji Kosan Co., Ltd., Kyoseki Process P-200, P-300, P-500, Kyoseki EPT 750, Kyoseki EPT 1000 and Kyoseki Process S90 manufactured by Nikko Kyoseki Co., Ltd., Lubrex 26, Lubrex 100 and Lubrex 460 manufactured by Shell Chemicals Co., Ltd., Esso Process Oil 815, Esso Process Oil 845 and Esso Process Oil B-1 manufactured by Exxon Mobil Co., Naprex 32 manufactured by Exxon Mobil Co., Mitsubishi 10 Light Process Oil manufactured by Nippon Oil Corporation, and the like.

Thus, the conjugated diolefin (co)polymer rubber of the invention is oil extended with the extender oil, which makes it possible to homogeneously finely disperse the filler such as carbon black or silica in the (co)polymer rubber, thereby being able to significantly improve processability and various characteristics of the vulcanizate. In addition, surprisingly, this can improve the mechanical strength of the resulting oil-extended (co)polymer rubber or the vulcanizate, particularly the wear resistance.

The compounding amount of the extender oil used in the invention is from 10 to 100 parts by weight, and preferably from 15 to 90 parts by weight, based on 100 parts by weight of the conjugated diolefin (co)polymer rubber. Less than 10 parts by weight results in poor wear resistance-improving effect and processability, whereas exceeding 100 parts by weight causes significant softening, resulting in poor processability.

There is no particular limitation on the oil extending method, and examples thereof include a method of adding the extender oil to a polymerization solution of the above-mentioned (co)polymer rubber, followed by mixing in a solution state. This method can operationally omit a process of mixing the (co)polymer rubber and the extender oil, and is preferred because of excellent mixing uniformity of both. When the extender oil is added to the polymerization solution, it is preferably added after the termination of the polymerization, for example, after the addition of a chain end modifier or after the addition of the polymerization terminator. A necessary amount of the extender oil is added to the polymerization solution containing an organic solvent, and mixed well in a solution state (a first step). Then, (1) a crumb is obtained by a steam stripping method of blowing steam into the polymerization solution containing the extender oil, or (2) the polymer solution containing the extender oil is directly desolvated by a means such as an extruder or a devolatilizer to separate oil-extended 1,2-polybutadiene from the solvent (a second step). The resulting wet oil-extended (co)polymer rubber is dried with a vacuum drier, a hot air dryer, a roll or the like, as needed (a third step), thereby being able to isolate the desired oil-extended (co)polymer rubber.

Further, as the oil extending method, it is also possible to blend the conjugated diolefin (co)polymer rubber of the invention and the extender oil in a molten state to prepare the oil-extended (co)polymer rubber. In this case, as a blending process, there is employed a single-screw extruder, a twin-screw extruder, a Banbury mixer, a roll, a kneader, a plastomill or the like, and the melt kneading temperature is suitably from 50 to 200° C.

Thus, according to the intention, there is preferably provided the oil-extended (co)polymer rubber containing the extender oil in an amount of 10 to 100 parts by weight based on 100 parts by weight of the conjugated diolefin (co)polymer rubber of the invention.

From a polymerization reaction solution containing the (co)polymer rubber obtained by the invention, the desired (co) polymer rubber of the invention can be isolated by a method used for an ordinary solution polymerization process, for example, by adding a stabilizer and the like in a solution state, thereafter adding the extender oil such as the aromatic process oil or the naphthenic process oil, or the liquid polymer having a weight average molecular weight of 150,000 or less (or a solution of the above-mentioned liquid polymer) as described above, as needed, separating the rubber from a solvent by a direct drying method or a steam stripping method, followed by washing, and drying the rubber with a vacuum dryer, a hot air dryer or a roll.

The (co)polymer rubber of the invention may be used alone or blended with natural rubber, polyisoprene rubber, polybutadiene rubber, emulsion-polymerized styrene-butadiene rubber or the like, and then kneaded with the reinforcing agent such as carbon black or silica and various compounding agents by means of a roll or a Banbury mixer, followed by the addition of sulfur, a vulcanization accelerator and the like, thereby being able to use as a belt, a vibration-proof rubber or another industrial product, starting with a rubber for a tire such as a read, a sidewall or a carcass.

When the (co)polymer rubber of the invention is used as the tire, especially as the tire tread the reinforcing agents with which the (co)polymer rubber is filled include, for example, fillers such as carbon black and silica.

In particular, when the vulanizate is effectively reinforced to expect good wear resistance and breaking strength, carbon black s suitably used. The filling amount of the filler is preferably from 20 to 120 parts by weight, and more preferably from 30 to 110 parts by weight, based on 100 parts by weight of all rubber components. As the carbon black, preferred is carbon black manufactured by the furnace process and having a nitrogen adsorption specific surface area of 50 to 200 m$^2$/g and a DBP oil absorption of 80 to 200 ml/100 g, and one of the FEF class, the HAF class, the ISAF class or the SAF class can be preferably used. In particular, one of a high aggregation type is preferred.

Further, particularly for the low fuel consumption tire application, the use of silica is preferred for the purpose of reducing the hysteresis loss of the vulcanizate to give good rolling resistance and to improve wet-skid resistance. As the silica, there can be used any of wet process silica, dry process silica and synthetic silicate silica. High in reinforcing effect is silica small in size. One of a small particle size and high aggregation type (high surface area, high oil absorption) is good in dispersibility in the rubber, so that it is particularly preferred in respect to physical properties and processability. Further, the use of silica of a high dispersible type also improves dispersibility in the rubber, and is preferred in terms of physical properties and processability. The average particle size of the silica is preferably from 5 to 60 μm, and particularly preferably from 10 to 35 μm, by the primary particle size. The filling amount of the silica is preferably from 20 to 120 parts by weight, and more preferably from 30 to 110 parts by weight, based on 100 parts by weight of all rubber components.

Further, when silica is used as the filler, various known silane coupling agents can be used in order to increase its reinforcing effect. The silane coupling agent means a compound having both a constituent component reactable with the silica surface such as an alkoxysilyl group and a constituent component reactable with the rubber, particularly a carbon-carbon double bond, such as a polysulfide, a mercapto group or an epoxy group, in its molecule. For example, bis (3-triethoxysilylpropyl)-tetrasulfide, bis-(3-triethoxysilylpropyl)disulfide, 3-mercaptopropyltrimethoxysilane and the like are well known as the silane coupling agent.

When silica is used as the filler, it is desirable that the filler contains at least 1 part by weight of silica and further contains the coupling agent in an amount of 0.5 to 20% by weight based on the silica. This improves the dispersibility of the silica, and improves the bonding ratio of the silica and the rubber, so that the effect of improving breaking strength, wear resistance and low hysteresis loss properties is obtained.

Further, the use of carbon black and silica in combination within the range of 20 to 120 parts by weight based on 100 parts by weight of all rubber components also allows good wear resistance and breaking strength to be compatible with a balance between low hysteresis loss performance and wet grip performance.

Furthermore, a carbon-silica dual phase filler can be mixed with the (co)polymer rubber of the invention, thereby being able to obtain excellent advantages similar to those obtained when the carbon black and the silica are used in combination with each other.

The carbon-silica dual phase filler is so-called silica coating carbon black in which silica is chemically bonded to a surface of carbon black, and sold from Cabot Corporation as CRX2000, CRX2002 or CRX2006 (trade name). The amount of the carbon-silica dual phase filler incorporated is preferably from 1 to 100 parts by weight, and more preferably from 5 to 95 parts by weight, based on 100 parts by weight of the total of the rubber components.

In the invention, the carbon-silica dual phase filler can be used in combination with a filling agent other than that. The simultaneously usable filling agents include carbon black, silica, calcium carbonate and magnesium carbonate, but there is no limitation thereon. Carbon black and silica are preferred among others.

These simultaneously usable filling agents are incorporated preferably in an amount of 3 to 100 parts by weight, and more preferably in an amount of 5 to 95 parts by weight, based on 100 parts by weight of the total of the rubber components.

On the other hand, when the rubber composition is prepared using the above-mentioned oil-extended (co)polymer rubber, it is preferred that the above-mentioned oil-extended (co)polymer rubber is contained in an amount of 30% by weight or more based on all rubber components, and that carbon black is contained in an amount of 2 to 100 parts by weight, and/or silica is contained in an amount of 30 to 100 parts by weight, as the fillers, based on 100 parts of all rubber components. When the silica is contained, the silane coupling agent is preferably contained in an amount of 5 to 20% by weight based on the silica. This improves the dispersibility of the silica, and further, the binding ratio of the silica and the rubber is improved, so that the effect of improving breaking strength, wear resistance and low hysteresis loss properties is obtained.

Further, when the rubber composition is prepared using the above-mentioned oil-extended (co)polymer rubber, it is also a preferred embodiment that the above-mentioned oil-extended (co)polymer rubber is contained in an amount of 30% by weight or more based on all rubber components, that (a) carbon black and silica are contained in an amount of 30 to 100 parts by weight as the total amount thereof, (b) the carbon-silica dual phase filler in an amount of 30 to 100 parts by weight, or (c) the carbon-silica dual phase filler and carbon black and/or silica in an amount of 30 to 100 parts by weight as the total amount thereof, as the filler, based on 100 parts by weight of all rubber components, and that a silane coupling agent is contained in an amount of 5 to 20% by weight based on the total amount of the silica and the carbon-silica dual phase filler.

This improves the dispersibility of the silica, and further, the binding ratio of the silica and the rubber is improved, so that the effect of improving breaking strength, wear resistance and low hysteresis loss properties is obtained.

A method for kneading the rubber composition obtained using the (co)polymer rubber (including the oil-extended polymer rubber) of the invention is not particularly limited. However, when the filler contains silica, the kneading can also be carried out by the following method, in order to sufficiently achieve reinforcement with silica to more improve the physical properties of vulcanized rubber.

The methods for kneading the rubber composition containing the (co)polymer rubber (including the oil-extended polymer rubber) of the invention, silica, the silane coupling agent, zinc white and a vulcanizing agent include (a) a method of mixing silica with the (co)polymer rubber, followed by kneading to prepare a first rubber composition, then, mixing the silane coupling agent with the first rubber composition, followed by kneading to prepare a second rubber composition, and subsequently, mixing zinc white and the vulcanizing agent with the second rubber composition, followed by kneading, or (b) a method of mixing silica with the (co) polymer rubber, followed by kneading to prepare a first rubber composition, then, mixing the silane coupling agent with the first rubber composition, followed by kneading, further mixing zinc white therewith, continuing the kneading to prepare a second rubber composition, and subsequently mixing the vulcanizing agent with the second rubber composition, followed by kneading.

According to the above-mentioned kneading methods, no silane coupling agent coexists in kneading the (co)polymer rubber and silica, so that the kneading temperature can be elevated to about 170 to about 180° C. to raise the reactivity of the (co)polymer rubber or the invention and silica. Accordingly, the performance is improved.

In the rubber composition of the invention, the vulcanizing agent can be used preferably within the range of 0.5 to 10 parts by weight, and more preferably within the range of 1 to 6 parts by weight, based on 100 parts by weight of all rubber components.

The vulcanizing agents typically include sulfur, and additionally a sulfur-containing compound, peroxide and the like.

Further, in combination with the vulcanizing agent, there may be used a vulcanization accelerator such as a sulfenamide-based accelerator, a guanidine-based accelerator or a thiuram-based accelerator in an amount according to need.

Furthermore, zinc white, a vulcanization auxiliary, an antiaging agent, a processing aid and the like may be used in an amount according to need.

In addition, various compounding agents for the rubber composition obtained using the (co)polymer rubber of the invention are not particularly limited However, the following compatibilizing agents, as well as another extender oil and various compounding agents such as a vulcanizing agent, a vulcanization accelerator, zinc white, an antiaging agent, an antiscorching agent, a tackifier and another filler, can also be added at the time of kneading, in order to improve processability at the time of kneading or to more improve a balance among wet-skid characteristics, low hysteresis loss and wear resistance.

The preferred compatibilizing agent is an organic compound selected from an epoxy group-containing compound, a carboxylic acid compound, a carboxylic acid ester compound, a ketone compound, an ether compound, an aldehyde compound, a hydroxyl group-containing compound and an amino group-containing compound, or a silicone compound selected from an alkoxysilane compound, a siloxane compound and an aminosilane compound.

Specific examples of the organic compounds of the compatlbilizing agents include the following compounds:

Epoxy group-containing compounds: butyl glycidyl ether, diglycidyl ether, propylene oxide, neopentyl glycol diglycidyl ether, an epoxy resin, epoxidized soybean oil, an epoxidized fatty acid ester and the like Carboxylic acid compounds: adipic acid, octylic acid, methacrylic acid and the like Carboxylic acid ester compounds: an acrylic acid ester, diethylene acrylate, ethyl methacrylate, an orthoacetic acid ester, ethyl acetoacetate, butyl acetate, isopropyl acetate, dimethyl carbonate, p-hydroxyphenylacetic acid, a polyester-based plasticizer, a stearic acid-based plasticizer and the like Ketone compounds: methylcyclohexane, acetylacetone and the like Ether compounds: isopropyl ether, dibutyl ether and the like Aldehyde compounds: undecylene aldehyde, decyl aldehyde, vanillin, 3,4-dimethoxybenzaldehyde, cuminaldehyde and the like Amino group-containing compounds: n-propylamine, isopropylamine, di-n-propylamine, disopropylamine, tri-ethylamine, 3-ethoxypropylamine, n-hexylamine, n-octylamine, 2-ethylhexylamine, isopropanolamine, ethylenediamine, N-ethylethylenediamine, ethyleneimine, hexamethylenediamine, 3-lauryloxypropylamine, aminophenol, aniline, 3-isopropoxy-aniline, phenylenediamine, aminopyridine, N-methyldi-ethanolamine, N-methylethanolaminine, 3-amino-1-propanol, ethylamine hydrochloride, n-butylamine hydrochloride and the like Hydroxyl group-containing compounds: isopropyl alcohol, butanol, octanol, octanediol, ethylene glycol, methylcyclo-hexanol, 2-mercaptoethanol, 3-methyl-3-methoxy-1-butanol, 3-methyl-1,5-pentanediol, 1-octadecanol, diethylene glycol, butylene glycol, dibutylene glycol, triethylene glycol and the like Above all, the epoxy group-containing compounds, the amino group-containing compounds and the hydroxyl group-containing compounds are preferred.

Specific examples of the silicone compounds as the compatibilizing agent include alkoxysilane compounds: trimethylmethoxysilane, trimethylethoxysilane, dimethyldimethoxysilane, methyltriethoxysilane, methyltriphenoxysilane, tetraethoxysilane, methyldiethoxysilane, vinyltrimethoxysilane and the like, siloxane compounds: a dimethylsiloxane oligomer, a silicone oil, an amino-modified silicone oil, an epoxy-modified silicone oil, a carboxyl-modified silicone oil, a polyether-modified silicone oil, an alkyl-modified silicone oil, a higher fatty acid ester-modified silicone oil, a higher alkoxy-modified silicone oil, a higher fatty acid ester-containing silicone oil and the like, and aminosilane compounds: hexamethyldisilazane, nonamethyltrisilazane, anilinotrimethylsilane, bis(dimethylamino) dimethylsilane, bis(diethylamino)dimethylsilane, triethylaminosilane and the like. Above all, the silazane compounds and bis(dimethylamino)dimethylsilane are preferred.

EXAMPLES

The invention will be illustrated in greater derail with reference to the following examples, but the invention should not be construed as being limited by these examples.

Various measurements in the examples were made in accordance with the following methods.

(1) Bonded Styrene Content

The content was determined by 270-MHz $^1$H—NMR.

(2) Vinyl Content of Conjugated Diolefin Moiety

The content was determined by 270-MHz $^1$H—NMR.

(3) Weight Average Molecular Weight

The molecular weight was determined in terms of polystyrene, using gel permeation chromatography (GPC) (HLC-8120 GPC manufactured by Tosoh Corporation).

(4) Mooney Viscosity ($MT_{1+4}$, 100° C.)

The Mooney viscosity was measured by preheating at a temperature of 100° C. for 1 minute with an L rotor with a rotor operation time of 4 minutes in accordance with JIS K6300.

(5) Specific Bond Content (mmol/kg)

The specific bond content was determined by the absorption at 1650 $cm^{-1}$ caused by stretching vibration of C=O of the specific bond, according to an infrared absorption spectrum.

(6) Alkoxysilyl Group Content (mmol/kg)

The alkoxysilyl group content was determined by the absorption at 1160 $cm^{-1}$ caused by a Si—C bond, according to an infrared absorption spectrum.

(7) Evaluation of Physical Properties of Vulcanized Rubber

A copolymer rubber was kneaded in a 250-cc Lab Plastomill according to each of compounding formulations shown in Table 2, and then, vulcanized at 145° C. for a specific period of time. Using the resulting vulcanized rubber, various measurements of (a) to (d) described below were conducted.

(a) Processability: The unity and gloss of a damp rubber after kneading were visually inspected and evaluated.

(b) Tensile Strength (300% modulus): The tensile strength was measured in accordance with JIS K6301. It is indicated by an index number, and a larger value shows a higher and better tensile strength.

(c) tan δ (50° C.) and tan δ (0° C.): tan δ (50° C.) was measured under conditions of a strain under tension of 1%, a frequency of 10 Hz and 50° C., using a dynamic spectrometer manufactured by Rheometrix (US). It is indicated by an index number, and a larger value shows lower and better rolling resistance. Further, tan δ (0° C.) was also measured at a strain under tension of 0.1%, a frequency of 10 Hz and 0° C., using the same instrument. It is indicated by an index number, and a larger value shows larger and better wet-skid resistance.

(d) Lambourn Wear Index (Wear Resistance): Using a Lambourn type wear tester, the index was expressed as the amount of wear at a slip rate of 25%, and the measurement temperature was room temperature. A larger index shows better wear resistance.

Examples 1, 5 and 9

Synthesis of Copolymer Rubber A and Evaluation Thereof

An autoclave reactor having an internal volume of 5 liters in which the atmosphere was replaced with nitrogen was charged with 2,750 g of cyclohexane, 41.3 g of tetrahydrofuran, 125 g of styrene and 365 g of 1,3-butadiene. After the temperature of the contents of the reactor was adjusted to 10° C., 325 mg of n-butyllithium was added to initiate polymerization. The polymerization was conducted under adiabatic conditions, and the maximum temperature reached 85° C.

At the time when the polymerization conversion reached 99%, 10 g of 1,3-butadiene was added, followed by further polymerization for 5 minutes. Then, 1,285 mg of polymethylene polyphenyl polyisocyanate was added, followed by a first stage modification reaction for 15 minutes. Thereafter, 2,750 mg of 3-aminopropyltrlmethoxysilane was added, followed by a second stage modification reaction for 15 minutes. Subsequently, 6,200 mg of bis-2-ethylhexanoate)tin was added as a condensation accelerator, followed by a reaction for 15 minutes.

Finally, 2,6-di-tert-butyl-p-cresol was added to the polymer solution after the reaction.

Then, desolvation was conducted by steam stripping, and a rubber was dried with a hot roll controlled to 110° C. to obtain a raw rubber. This raw rubber is named copolymer rubber A. The composition and physical properties of copolymer rubber A thus obtained are shown in Table 1.

Compounded rubbers prepared using copolymer rubber A according to compounding formulations I and II shown in Table 2 were vulcanized, and physical properties thereof were evaluated. The results thereof are shown in Tables 3 and 4 as Examples 5 and 9

Examples 2, 6 and 10

Synthesis of Copolymer Rubber B and Evaluation Thereof

Copolymer rubber B was obtained in the same manner as in Example 1 with the exception that bis-(2-ethylhexanoate)tin was not added. The composition and physical properties of copolymer rubber B thus obtained are shown in Table 1.

Compounded rubbers prepared using copolymer rubber B according to compounding formulations I and II shown in Table 2 were vulcanized, and physical properties thereof were evaluated. The results thereof are shown in Tables 3 and 4 as Examples 6 and 10.

Examples 3, 7 and 11

Synthesis of Copolymer Rubber C and Evaluation Thereof

Copolymer rubber C was obtained in the same manner as in Example 1 with the exception that the amount of polymethylene polyphenyl polyisocyanate added was changed to the amount shown in Table 1. The composition and physical properties of copolymer rubber C thus obtained are shown in Table 1.

Compounded rubbers prepared using copolymer rubber C according to compounding formulations I and II shown in Table 2 were vulcanized, and physical properties thereof were evaluated. The results thereof are shown in Tables 3 and 4 as Examples 7 and 11.

Examples 4, 8 and 12

Synthesis of Copolymer Rubber D and Evaluation Thereof

Copolymer rubber D was obtained in the same manner as in Example 3 with the exception that the condensation accelerator was changed to tetra-sec-butoxytitanium. The composition and physical properties of copolymer rubber D thus obtained are shown in Table 1.

Compounded rubbers prepared using copolymer rubber D according to compounding formulations I and II shown in Table 2 were vulcanized, and physical properties thereof were evaluated. The results thereof are shown in Tables 3 and 4 as Examples 8 and 12.

Comparative Examples 1 to 15

Synthesis of Copolymer Rubbers E to I and Evaluation Thereof

Copolymer rubbers A, F, G, H and I were obtained in the same manner as in Example 1 with the exception that the polymerization formulation was changed to ones shown in Table 1. The composition and physical properties of the copolymer rubbers thus obtained are shown in Table 1.

Compounded rubbers prepared using copolymer rubbers E to I according to compounding formulations I and II shown in Table 2 were vulcanized, and physical properties thereof were evaluated. The results thereof are shown in Tables 3 and 4 as Comparative Examples 6 to 15.

TABLE 1

|  | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|
| Copolymer Rubber Polymerization Formulation Solvent | A | B | C | D | E | F | G | H | I |
| Cyclohexane (g) Vinyl Content Modifier | 2750 | 2750 | 2750 | 2750 | 2750 | 2750 | 2750 | 2750 | 2750 |
| Tetrahydrofuran (g) Polymerization Monomer | 41.3 | 41.3 | 41.3 | 41.3 | 41.3 | 41.3 | 41.3 | 41.3 | 41.3 |
| Styrene (g) | 125 | 125 | 125 | 125 | 125 | 125 | 125 | 125 | 125 |
| Butadiene (g) | 375 | 375 | 375 | 375 | 375 | 375 | 375 | 375 | 375 |

TABLE 1-continued

|  | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|
| Polymerization Initiator |  |  |  |  |  |  |  |  |  |
| n-Butyllithium (mg) | 325 | 325 | 325 | 325 | 325 | 325 | 325 | 325 | 325 |
| Additive |  |  |  |  |  |  |  |  |  |
| MDI *1 (mg) | 1285 | 1285 | 1752 | 1752 |  | 1285 | 1285 | 1285 |  |
| N—Si *2 (mg) | 2750 | 2750 | 2750 | 2750 |  |  |  |  |  |
| SnCl$_4$ (mg) |  |  |  |  | 195 |  |  |  |  |
| ROH *3 (mg) |  |  |  |  |  |  | 1550 |  |  |
| N—R *4 (mg) |  |  |  |  |  |  |  | 1415 |  |
| SiOR *5 (mg) |  |  |  |  |  |  |  |  | 1270 |
| BEHAT *6 (mg) | 6200 |  | 6200 |  |  |  |  |  |  |
| TBOT *7 (mg) |  |  |  | 4350 |  |  |  |  |  |
| Extender Oil |  |  |  |  |  |  |  |  |  |
| Amount of Extender Oil (g) |  |  |  |  |  |  |  |  | 187.5 |
| Properties of Copolymer Rubber |  |  |  |  |  |  |  |  |  |
| Bonded Styrene Amount (wt %) | 25 | 25 | 25 | 25 | 25 | 25 | 25 | 25 | 25 |
| Vinyl Content (%) | 55 | 56 | 56 | 56 | 55 | 55 | 55 | 56 | 55 |
| Weight Average Molecular Weight (×10,000) | 62 | 45 | 57 | 64 | 62 | 81 | 49 | 47 | 32 |
| Mooney Viscosity | 74 | 42 | 88 | 75 | 70 | 79 | 44 | 42 | 46 |
| Specific Bond Content (mmol/kg) | 9.2 | 10.2 | 15.1 | 15.4 | — | — | — | — | — |
| Alkoxysilyl Group Content (mmol/kg) | 10.4 | 15.3 | 11.2 | 11.4 | — | — | — | — | 3.6 |

*1: Polymethylene polyphenyl polyisocyanate (manufactured by Dow Polyurethane Japan, Ltd.)
*2: 3-Aminopropyltrimethoxysilane (manufactured by Tokyo Chemical Industry Co., Ltd.)
*3: 2-Ethylhexanol (manufactured by Wako Pure Chemical Industries, Ltd.)
*4: 2-Ethylhexylamine (manufactured by Wako Pure Chemical Industries, Ltd.)
*5: Methyltriphenoxysilane (manufactured by Tokyo Chemical Industry Co., Ltd.)
*6: Bis-(2-ethylhexanoate)tin (manufactured by Wako Pure Chemical Industries, Ltd.)
*7: Tetrabutoxytitanium (manufactured by Tokyo Chemical Industry Co., Ltd.)

TABLE 2

| Compounding Formulation (phr) | I | II |
|---|---|---|
| Copolymer Rubber *1) | 70 | 100 |
| Extender Oil *2) | 37.5 | 37.5 |
| Butadiene Rubber *3) | 30 |  |
| Carbon Black *4) | 5.6 | 70 |
| Silica *5) | 70 |  |
| Silane Coupling Agent *6) | 5.6 |  |
| Stearic Acid | 2.0 | 2.0 |
| Antiaging Agent *7) | 1.0 | 1.0 |
| Zinc Oxide | 3.0 | 3.0 |
| Vulcanization Accelerator NS *8) |  | 1.0 |
| Vulcanization Accelerator CZ *9) | 1.5 |  |
| Vulcanization Accelerator D *10) | 1.0 | 0.5 |
| Sulfur | 1.5 | 1.5 |

*1) When a copolymer rubber previously oil extended is used, the amount of only a rubber portion obtained by excluding an extender oil component from the oil-extended copolymer rubber is indicated.
*2) Aromax #3 manufactured by Fuji Kosan Co., Ltd. When a copolymer rubber previously oil extended is used, the total amount of an extender oil contained in the oil-extended copolymer rubber and the extender oil additionally added at the time of kneading is indicated.
*3) BR01 manufactured by JSR Corporation
*4) Diablack N339 manufactured by Mitsubishi Chemical Corporation
*5) Nipsil AQ manufactured by Nippon Silica Industrial Co., Ltd.
*6) Si69 manufactured by Degussa AG
*7) NOCRAC 810NA manufactured by Ouchishinko Chemical Industrial Co., Ltd.
*8) NOCCELER NS-F manufactured by Ouchishinko Chemical Industrial Co., Ltd.
*9) NOCCELER CZ manufactured by Ouchishinko Chemical Industrial Co., Ltd.
*10) NOCCELER D manufactured by Ouchishinko Chemical Industrial Co., Ltd.

TABLE 3

|  | Example 5 | Example 6 | Example 7 | Example 8 | Comparative Example 6 | Comparative Example 7 | Comparative Example 8 | Comparative Example 9 | Comparative Example 10 |
|---|---|---|---|---|---|---|---|---|---|
| Copolymer Rubber | A | B | C | D | E | F | G | H | I |
| Compounding Formulation | I | I | I | I | I | I | I | I | I |
| Vulcanization Physical |  |  |  |  |  |  |  |  |  |

TABLE 3-continued

|  | Example 5 | Example 6 | Example 7 | Example 8 | Comparative Example 6 | Comparative Example 7 | Comparative Example 8 | Comparative Example 9 | Comparative Example 10 |
|---|---|---|---|---|---|---|---|---|---|
| Properties |  |  |  |  |  |  |  |  |  |
| Processability | ○ | ○ | ○ | ○ | ○ | ○ | ○ | ○ | ○ |
| Tensile Strength (index) | 105 | 105 | 106 | 106 | 100 | 104 | 104 | 103 | 104 |
| tan δ @ 0° C. (index) | 107 | 103 | 108 | 109 | 100 | 101 | 102 | 102 | 103 |
| tan δ @ 50° C. (index) | 123 | 115 | 128 | 130 | 100 | 105 | 105 | 104 | 108 |
| Wear Resistance (index) | 116 | 116 | 117 | 117 | 100 | 109 | 110 | 110 | 108 |

TABLE 4

|  | Example 9 | Example 10 | Example 11 | Example 12 | Comparative Example 11 | Comparative Example 12 | Comparative Example 13 | Comparative Example 14 | Comparative Example 15 |
|---|---|---|---|---|---|---|---|---|---|
| Copolymer Rubber | A | B | C | D | E | F | G | H | I |
| Compounding Formulation | II | II | II | II | II | II | II | II | II |
| Vulcanization Physical Properties |  |  |  |  |  |  |  |  |  |
| Processability | ○ | ○ | ○ | ○ | ○ | ○ | ○ | ○ | ○ |
| Tensile Strength (index) | 103 | 103 | 104 | 105 | 100 | 103 | 103 | 102 | 103 |
| tan δ @ 0° C. (index) | 107 | 107 | 108 | 109 | 100 | 106 | 105 | 105 | 101 |
| tan δ @ 50° C. (index) | 115 | 115 | 117 | 120 | 100 | 108 | 109 | 109 | 106 |
| Wear Resistance (index) | 109 | 108 | 110 | 111 | 100 | 108 | 108 | 107 | 105 |

The results of Tables 1, 2, 3 and 4 show the following. From the results of evaluation of high silica filling blending (compounding formulation I) of Table 3, in the case of Examples 5 to 8 using conjugated diolefin copolymer rubbers A, B, C and D of the invention, each having a urea bond and an alkoxysilyl group at the same time in the conjugated diolefin copolymer rubber, good processability is obtained, and low hysteresis loss properties (tan δ at 50° C.) and wear resistance are balanced at the same time in a high level without impairing breaking strength and wet-skid characteristics (tan δ at 0° C.) This is also the same in carbon black blending (compounding formulation II) (Examples 9 to 12) of Table 4. Above all, Example 8 using conjugated diolefin copolymer rubber D according to the high silica filling blending (compounding formulation I) more significantly reveals that the conjugated diolefin copolymer rubber of the invention improves low hysteresis loss properties without impairing processability, breaking strength, wet-skid characteristics and wear resistance.

On the other hand, in the case of Comparative Examples 7, 10, 12 and 15 using conjugated diolefin copolymer rubbers F having only an isocyanate group or conjugated diolefin copolymer rubbers I having only an alkoxysilyl group, the effect of improving the various characteristics is small. Further, also in Comparative Examples 8, 9, 13 and 14 using conjugated diolefin copolymer rubber G or H independently having an amide bond or a urea bond in the conjugated diolefin copolymer rubber, improvement of the various physical characteristics in the conjugated diolefin copolymer rubber of the invention is not obtained.

INDUSTRIAL APPLICABILITY

The conjugated diolefin (co)polymer rubber obtained according to the invention is excellent in processability, and excellent in a balance among wet-skid characteristics, low hysteresis loss, wear resistance and breaking strength, when vulcanization treatment is performed to form a vulcanized rubber. This is therefore useful as a material for a tread of a tire for low fuel consumption, a large sized tire or a high performance tire.

The invention claimed is:

1. A method for producing a conjugated diolefin (co)polymer rubber, which comprises polymerizing either a conjugated diolefin or a conjugated diolefin and an aromatic vinyl compound in a hydrocarbon solvent by anionic polymerization using at least one compound selected from the group consisting of an organic alkali metal and an organic alkaline earth metal as an initiator, thereafter reacting a living polymer chain end thereof with a polyisocyanate compound to bond one isocyanate group of the polyisocyanate compound and the chain end of the living polymer, and then reacting a residual isocyanate group of the polyisocyanate compound bonded to the living polymer chain end with an alkoxysilane compound comprising an active hydrogen functional group wherein the residual isocyanate group of the polyisocyanate compound bonded to the living polymer chain is bonded to the active hydrogen functional group of the alkoxysilane compound, wherein the conjugated diolefin (co)polymer rubber is represented by the following formula (1)

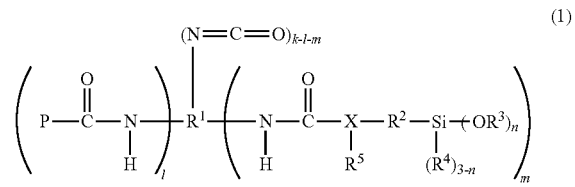

(1)

wherein P is a conjugated diolefin or a (co)polymer chain of a conjugated diolefin and an aromatic vinyl compound, X is any one of a nitrogen atom, an oxygen atom and a sulfur atom $R^1$ is an alkyl group having 1 to 20 carbon atoms or an aryl group, $R^2$ is an alkylene group having 1 to 12 carbon atoms, $R^3$ and $R^4$ are each independently an alkyl group having 1 to 20 carbon atoms or an aryl group, $R^5$ has no bond, or is a hydrogen atom, an alkyl group having 1 to 20 carbon atoms or an aryl group, k is an integer of 2 to 4, l is an integer of 1 to 3, m is an integer of 1 to 3, and n is an integer of 1 to 3, provided that $l+m \leq k$.

2. The method for producing the conjugated diolefin (co)polymer rubber according to claim 1, wherein the active hydrogen functional group is an amino group, a mercapto group or a hydroxyl group.

3. The method for producing the conjugated diolefin (co)polymer rubber according to claim 1, wherein the alkoxysilane compound having the active hydrogen functional group is a silane coupling agent.

4. The method for producing the conjugated diolefin (co)polymer rubber according to claim 1, wherein the alkoxysilane compound having the active hydrogen functional group is a compound represented by $H_2N(CH_2)_qSi(OR)_3$, wherein q is an integer of 1 to 12, and each occurrence of R, which may be the same or different, is an alkyl group having 1 to 20 carbon atoms or an aryl group.

5. The method for producing the conjugated diolefin (co)polymer rubber according to claim 2, wherein the alkoxysilane compound having the active hydrogen functional group is a compound represented by $H_2N(CH_2)_qSi(OR)_3$, wherein q is an integer of 1 to 12, and each occurrence of R, which may be the same or different, is an alkyl group having 1 to 20 carbon atoms or an aryl group.

6. The method for producing the conjugated diolefin (co)polymer rubber according to claim 1, wherein the content of a urethane bond or a urea bond formed by the reaction of active hydrogen in the alkoxysilane compound having the active hydrogen functional group with the isocyanate of the polyisocyanate compound or a bond obtained by the reaction of the mercapto group with the isocyanate group is from 0.5 to 200 mmol/kg·(co)polymer rubber polymer, and that the content of an alkoxysilyl group is from 0.5 to 200 mmol/kg·(co)polymer rubber polymer.

7. A method for producing a conjugated diolefin (co)polymer rubber, which comprises condensing the alkoxysilyl groups bonded to a polymer chain of the conjugated diolefin (co)polymer rubber according to claim 1, wherein a condensation accelerator is present.

8. The method for producing the conjugated diolefin (co)polymer rubber according to claim 7, wherein the condensation accelerator is an alkoxide compound of titanium.

9. A conjugated diolefin (co)polymer rubber obtained by the method according to claim 1.

10. A rubber composition comprising 20 to 120 parts by weight of a filler based on 100 parts by weight of all rubber components in which the conjugated diolefin (co)polymer rubber according to claim 9 accounts for 30% or more by weight of all rubber components.

11. A tire in which a tread member or a sidewall member comprises the rubber composition according to claim 10.

12. The method for producing the conjugated diolefin (co)polymer rubber according to claim 1, wherein the conjugated diolefin (co)polymer rubber is represented by the following formula (2)

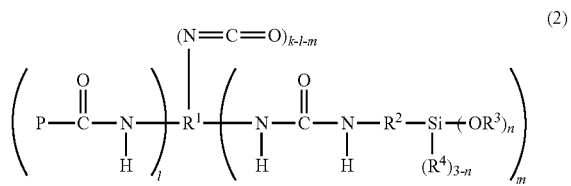

wherein P is a conjugated diolefin or a (co)polymer chain of a conjugated diolefin and an aromatic vinyl compound, $R^1$ is an alkyl group having 1 to 20 carbon atoms or an aryl group, $R^2$ is an alkylene group having 1 to 12 carbon atoms, $R^3$ and $R^4$ are each independently an alkyl group having 1 to 20 carbon atoms or an aryl group, k is an integer of 2 to 4, l is an integer of 1 to 3, m is an integer of 1 to 3, and n is an integer of 1 to 3, provided that $l+m \leq k$.

13. The method for producing the conjugated diolefin (co)polymer rubber according to claim 1, wherein the content of the alkoxysilyl groups bonded to the (co)polymer rubber is preferably from 0.5 to 200 mmol/kg·(co)polymer rubber polymer.

14. The method for producing the conjugated diolefin (co)polymer rubber according to claim 1, wherein the process comprises polymerizing either a conjugated diolefin or a conjugated diolefin and an aromatic vinyl compound in a hydrocarbon solvent by anionic polymerization using an organic alkali metal and/or an organic alkali earth metal as an initiator, adding a polyisocyanate compound to react it with a living polymer chain end when the polymerization has substantially completed, then reacting a residual isocyanate group of the polyisocyanate compound bonded to the living polymer chain end with a an active hydrogen functional group of an alkoxysilane compound comprising.

15. The method for producing the conjugated diolefin (co)polymer rubber according to claim 14, further comprising conducting deblocking.

16. The method for producing the conjugated diolefin (co)polymer rubber according to claim 1, wherein an alkoxysilyl group of the alkoxysilane compound is introduced by a two-stage reaction, wherein the first stage reaction is represented by formula (3), and the second stage reaction is represented by formula (4)

$$P^-Li^+OCNR'NCO \rightarrow P—R'NCO \qquad (3)$$

$$P—R'NCO+NH_2(CH_2)_qSi(OR)_3 \rightarrow$$

$$P—R'NHCONH(CH_2)_qSi(OR)_3 \qquad (4)$$

wherein P represents a polymer chain, $P^-Li^+$ represents a living polymer chain end, R' represents an organic group, q is an integer of 1 to 12, and each occurrence of R, which may be the same or different, is an alkyl group having 1 to 20 carbon atoms or an aryl group.

17. The method for producing the conjugated diolefin (co)polymer rubber according to claim 16, wherein the second stage reaction comprises reacting the polymer having an isocyanate group at a chain end with the active hydrogen functional group of the alkoxysilane compound to obtain the conjugated diolefin (co)polymer rubber having a urea bond and an alkoxysilyl group in the polymer.

18. The method for producing the conjugated diolefin (co)polymer rubber according to claim 16, wherein the polyisocyanate compound in formula (3) is selected from the group consisting of 2,4-tolylene diisocyanate, isophorone diisocyanate, xylylene diisocyanate, methylene bis(4-cyclohexyl isocyanate), 1,3-bis(isocyanate methyl)cyclohexane and polymethylene polyisocyanate.

* * * * *